(12) United States Patent
Sudo et al.

(10) Patent No.: US 8,726,692 B2
(45) Date of Patent: *May 20, 2014

(54) METHOD OF MANUFACTURING VITREOUS SILICA CRUCIBLE

(75) Inventors: Toshiaki Sudo, Akita (JP); Eriko Suzuki, Akita (JP)

(73) Assignee: Japan Super Quartz Corporation, Akita (JP)

( * ) Notice: Subject to any disclaimer, the term of this patent is extended or adjusted under 35 U.S.C. 154(b) by 216 days.

This patent is subject to a terminal disclaimer.

(21) Appl. No.: 13/337,948

(22) Filed: Dec. 27, 2011

(65) Prior Publication Data

US 2012/0167628 A1    Jul. 5, 2012

(30) Foreign Application Priority Data

Dec. 31, 2010    (JP) ................................. 2010-294634

(51) Int. Cl.
*C03B 19/09*    (2006.01)
*C03B 20/00*    (2006.01)

(52) U.S. Cl.
USPC .............. 65/17.4; 65/29.1; 65/17.3; 65/29.19

(58) Field of Classification Search
CPC .................................................... C03B 19/095
See application file for complete search history.

(56) References Cited

U.S. PATENT DOCUMENTS

| | | | | |
|---|---|---|---|---|
| 4,043,780 A | * | 8/1977 | Bricker et al. ................ | 65/29.19 |
| 4,072,489 A | * | 2/1978 | Loxley et al. .................. | 65/17.3 |
| 5,174,801 A | | 12/1992 | Matsumura et al. | |
| 5,951,730 A | * | 9/1999 | Schermerhorn ............... | 65/17.3 |
| 6,553,787 B1 | * | 4/2003 | Akiho et al. ................... | 65/17.3 |
| 2004/0237588 A1 | * | 12/2004 | Schwertfeger et al. ........ | 65/17.3 |
| 2010/0005836 A1 | * | 1/2010 | Kishi et al. ...................... | 65/124 |
| 2010/0229599 A1 | | 9/2010 | Fujita et al. | |
| 2010/0244311 A1 | | 9/2010 | Kishi et al. | |
| 2011/0295405 A1 | * | 12/2011 | Sudo et al. .................... | 700/104 |

FOREIGN PATENT DOCUMENTS

| | | |
|---|---|---|
| EP | 2141130 A1 | 1/2010 |
| EP | 2172432 A1 | 4/2010 |
| EP | 2226300 A1 | 9/2010 |
| JP | 08-169798 A | 7/1996 |

(Continued)

OTHER PUBLICATIONS

"Les Pyrometres Infrarouge Sans Contact", Mesures Regulation Automatisme, CFE. Paris, FR, No. 706, Jun. 1, 1998, pp. 88-94, XP000869136, ISSN: 0755-219X.

(Continued)

*Primary Examiner* — Matthew Daniels
*Assistant Examiner* — Lisa Herring
(74) *Attorney, Agent, or Firm* — Law Office of Katsuhiro Arai (57) ABSTRACT

The present invention provides a method of manufacturing a vitreous silica crucible by heating and fusing a silica powder layer in a rotating mold by arc discharge generated by carbon electrodes comprising: a preparation process for determining optimal temperatures during heating and fusing the silica powder layer for one or more selected from the group consisting of the silica powder layer, fume generated during arc fusing, and arc flame generated in the arc discharge; a temperature measuring process for measuring actual temperatures during heating and fusing for one or more selected from the group where the optimal temperatures are determined; and a temperature controlling process for controlling the actual temperatures for one or more selected from the group where the actual temperatures are measured so that the actual temperatures match the optimal temperatures.

5 Claims, 9 Drawing Sheets

(56) References Cited

FOREIGN PATENT DOCUMENTS

| JP | 2933404 B | 8/1999 |
|----|-----------|--------|
| JP | 2002-154890 A | 5/2002 |
| JP | 2002-154894 A | 5/2002 |
| JP | 3926167 B2 | 6/2007 |

OTHER PUBLICATIONS

Extended European Search Report (EESR) mailed Oct. 18, 2012, issued in corresponding Application No. EP 11196065.4.
Korean Office Action issued by the Korean Patent Office, mailed Apr. 26, 2013, for Korean counterpart application No. 10-2011-0144118.

* cited by examiner

METHOD OF MANUFACTURING VITREOUS SILICA CRUCIBLE

CROSS-REFERENCE TO RELATED APPLICATION

This application is related to Japanese Patent Application No. 2010-294634 filed on Dec. 31, 2010, whose priority is claimed and the disclosure of which is incorporated by reference in its entirety.

BACKGROUND OF THE INVENTION

1. Field of the Invention

The present invention relates to a method of manufacturing a vitreous silica crucible which is suitably used for pulling a silicon single crystal.

2. Description of the Related Art

A silicon single crystal has been manufactured by the Czochralski method (the CZ method) using a vitreous silica crucible. In this method, polycrystalline silicon raw material is melted and retained in the vitreous silica crucible, a seed crystal of silicon single crystal is dipped into the silicon melt, and the seed crystal is gradually pulled while rotating it, to produce a silicon single crystal by use of the seed crystal as a core.

The vitreous silica crucible used in the CZ method is manufactured by the rotating mold method where silica powder is supplied into a rotating mold to form a silica powder layer, and the silica powder layer is heated and fused by arc discharge generated by carbon electrodes. In the rotating mold method, the arc-fused portion reaches a high temperature of over 2000 deg. C.

The thus-manufactured vitreous silica crucible has a two-layer structure including an outer layer containing a number of bubbles and a transparent inner layer.

It is known that the property of the crucible inner surface which contacts silicon melt while pulling a single crystal influences the property of the obtained silicon single crystal, and thus influences the yield of silicon wafers which are the final products.

Specifically, for example, when a single crystal is pulled by use of a vitreous silica crucible, melt surface vibration occurs and thus proper seeding of a seed crystal becomes difficult. In this case, there frequently occur problems that pulling of a silicon single crystal is prevented or single crystallization is prevented. The phenomenon is called melt surface vibration, and melt surface vibration is more likely to occur with the increase of the diameter of a silicon single crystal. Furthermore, it is known that melt surface vibration is related to the inner surface property of a vitreous silica crucible. JP-A-2002-154894 discloses one method of coping with this problem.

Furthermore, in order to obtain a wafer having a diameter of 300 mm or more, i.e. approx. 450 mm, it has been demanded to increase the diameter of a silicon single crystal. This demand lengthens the time for pulling a single crystal, and thus lengthens the time during which the crucible inner surface contacts silicon melt of 1400 deg. C. or more. This causes the following problem.

When the time for pulling is lengthened, the contact time of the crucible inner surface with silicon melt is also lengthened. In this case, the crucible inner surface reacts with silicon melt, to cause crystallization in the surface or a shallow layer from the surface of the crucible inner surface. The reaction causes ring-shaped brown cristobalite (hereinafter, the ring-shaped cristobalite is referred to as "brown ring"). A cristobalite layer is not formed in the inside of the brown ring, or if any, the cristobalite layer is a thin layer. The brown ring increases the area as the increase of the operation time, and the adjacent brown rings merge and grow. Finally, the center of the brown ring is corroded to expose irregular vitreous silica corroded surface.

When tiny pieces of vitreous silica detach from the vitreous silica corroded surface, dislocation is more likely to occur in the silicon single crystal, and thus the single crystallization yield deteriorates. In particular, in order to grow a silicon single crystal for manufacturing a wafer having a diameter of 300 mm, it is necessary to continue the operation of the CZ method for 100 hours or more, and thus the vitreous silica corroded surface is more likely to appear.

It is considered that the aforementioned brown ring is generated from a core which is a tiny scratch on the vitreous silica surface, a crystalline residual portion which is an unfused portion of material silica powder, or a defect of vitreous silica structure. It is considered that the number of the brown rings can be reduced by maintaining a good surface state of vitreous silica, or reducing the crystalline residual portion by fusing silica powder at higher temperature and for a longer time in the vitreous silica crucible manufacturing process. Furthermore, as described in JP-B-2811290 and JP-B-2933404, amorphous synthetic silica powder can be used as material silica powder for forming the inner surface.

SUMMARY OF THE INVENTION

However, there is no established technique to manufacture a vitreous silica crucible having a suitably controlled inner surface property so as to enable stable manufacturing of a high-quality silicon single crystal in high productivity.

The present invention has been made in view of these circumstances, and provides a method of manufacturing a vitreous silica crucible having a suitably controlled inner surface property.

The present inventors have conducted extensive research and found that the temperature of the silica powder layer during heating and fusing, the temperature of the fume generated during arc fusing, and the temperature of the arc flame generated in arc discharge can be accurately measured by appropriately setting the measurement wavelength, and further found that these temperatures are related to the property of the crucible manufactured by heating and fusing the silica powder layer.

Then, the present inventors found that the crucible having a suitably controlled inner surface property can be manufactured by appropriately controlling one or more of the actual temperatures of the silica powder layer, the fume, and the arc flame, during heating and fusing the silica powder layer.

The present invention provides a method of manufacturing a vitreous silica crucible by heating and fusing a silica powder layer in a rotating mold by arc discharge generated by carbon electrodes comprising:

a preparation process for determining optimal temperatures during heating and fusing the silica powder layer for one or more selected from the group consisting of the silica powder layer, fume generated during arc fusing, and arc flame generated in the arc discharge;

a temperature measuring process for measuring actual temperatures during heating and fusing for one or more selected from the group where the optimal temperatures are determined; and a temperature controlling process for controlling the actual temperatures for one or more selected from the group where the actual temperatures are measured so that the actual temperatures match the optimal temperatures.

The optimal temperatures and the actual temperatures of the silica powder layer are preferred to be measured by detecting the radiation energy of a wavelength of 4.8 to 5.2 μm.

The optimal temperature and the actual temperature of the silica powder layer are preferred to be temperatures of the inner surface of the silica powder layer.

Preferably, the optimal temperatures are determined with time, and the actual temperatures are controlled with time.

The optimal temperature and the actual temperature of the silica powder layer are preferred to be temperatures at a portion corresponding to the corner portion of the vitreous silica crucible.

According to the present invention, one or more of the temperatures of the silica powder layer, the fume, and the arc flame can be controlled to be the optimal temperature, and thus the fused state of the silica powder layer can be appropriately controlled. As a result, a vitreous silica crucible having an appropriately controlled inner surface property can be manufactured.

The fume is dust generated by solidification of SiO vapor generated from the surface of the silica powder layer during heating and fusing the silica powder layer. It is considered that the fume temperature during heating and fusing the silica powder layer is related to the property of the manufactured crucible because the fume temperature is related to the degree of fire polishing.

The optimal temperature refers to a temperature empirically determined from the temperature data for the crucible, having a good property, which has enabled stable manufacturing of a high-quality silicon single crystal in high productivity or a temperature determined by a computational method such as simulation.

The crucible properties mean factors which can influence properties of semiconductor single crystal pulled by use of the vitreous silica crucible. Such properties includes a vitrification state on a crucible inner surface, a bubble distribution and bubble size along a thickness direction, OH group content, impurities distribution, surface irregularity, and non-uniformity of these factors along the crucible height direction.

In particular, in manufacturing a larger crucible having an opening diameter of 23 inches (58.4 cm) to 40 inches (116 cm) or more, the unevenness of the surface temperature caused unevenness of the inner surface property of the crucible. However, according to the present invention, the actual temperatures of the fume and the arc flame are controlled to be the respective optimal temperatures, and thus the unevenness of the temperature can be prevented, and thus it is possible to manufacture a vitreous silica crucible having a uniform inner surface property.

In the present invention, when the optimal temperatures and actual temperatures of the silica powder layer 11, the fume, and the arc flame are measured by detecting the radiation energy of a wavelength of 4.8 to 5.2 μm, those temperatures can be accurately measured.

In the present invention, when the optimal temperature and the actual temperature of the silica powder layer are temperatures of the inner surface of the silica powder layer, the crucible inner surface state which largely influences the property of the manufactured silicon single crystal can be particularly suitably controlled.

In the present invention, furthermore, in the preparation process, when the optimal temperatures are determined with time, and the actual temperatures are controlled with time, the inner surface property of the manufactured vitreous silica crucible can be more suitably controlled.

The optimal temperatures for the silica powder layer, the fume, and the arc flame may be determined only at some important time points in the preparation process, and the actual temperatures are controlled at the time points. Even in such embodiment, the effect of the invention is exhibited.

In the present invention, when the optimal temperature and the actual temperature of the silica powder layer are temperatures at the corner portion of the silica powder layer, the fused state of the silica powder layer can be more precisely controlled.

A crucible can be divided into three zones of a bottom portion, a wall portion, and a corner portion. The corner portion is a portion smoothly connecting the cylindrical wall portion and the bottom portion having a constant curvature. In other words, the corner portion is a portion from the point where the constant curvature at the bottom portion starts to change to the point where the curvature matches that of the wall portion (which is infinite when the wall portion is cylindrical).

Figure 3:
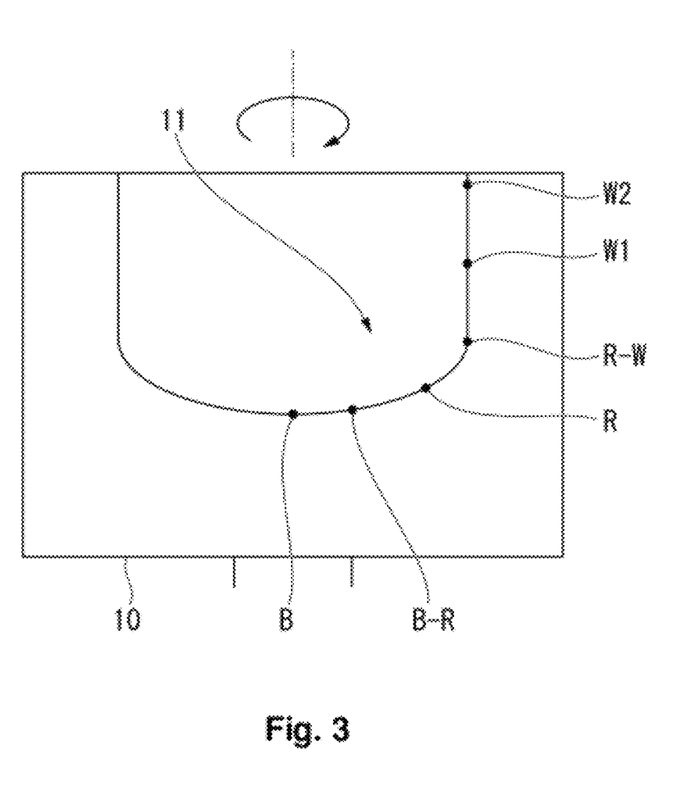
FIG. 3 is a sectional view showing the temperature measuring positions in the silica powder layer.

The present inventors have carried out temperature measurement at 6 positions of the position B, the position B-R, the position R, the position R-W, the position W1, and the position W2, as shown in FIG. 3, from the bottom center to the upper end of the silica powder layer.

Here, the position B is the bottom center (on the rotation axis) of the molded body. The position B-R is around the middle position between the position B and the border of the bottom portion and the corner portion. The position R is a position in the corner portion and near the border of the bottom portion and the corner portion. The position R-W is a position in the corner portion and near the border of the wall portion and the corner portion. The position W1 is around the middle position between the upper end of the opening and the border of the wall portion and the corner portion. The position W2 is around the upper end of the opening.

Figure 4A:
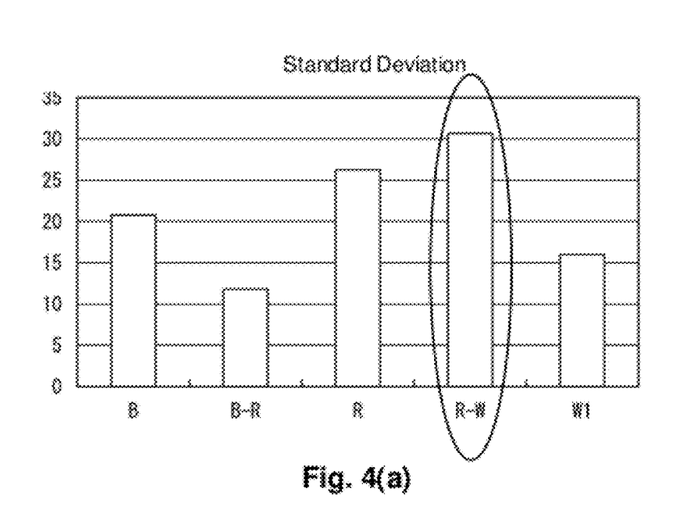
FIG. 4(a) is a graph showing the standard deviation.
Figure 4B:
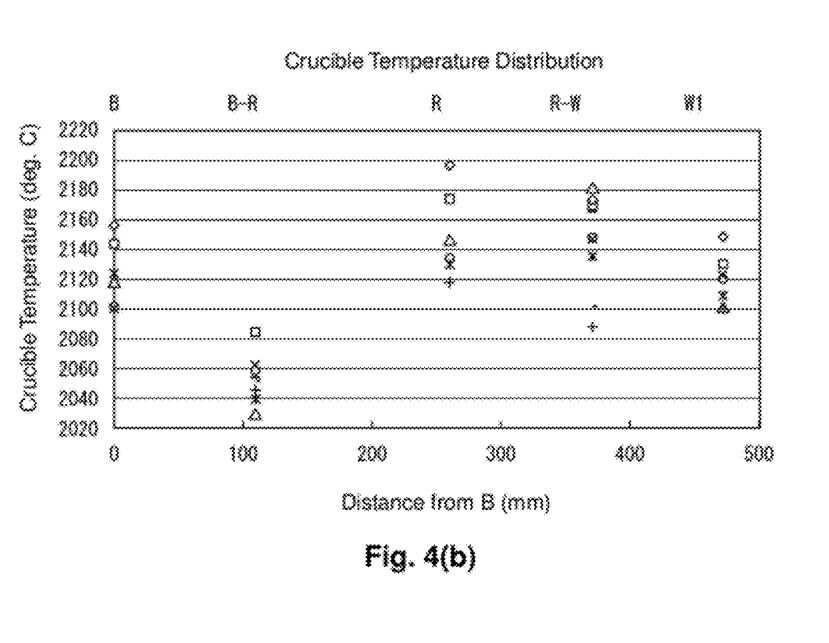

As a result, the standard deviation of the measured temperature was largest at the positions R-W and R as shown in FIGS. 4(a) and 4(b).

This result shows that it is possible to accurately control the fused state of the silica powder layer by determining the optimal temperature at the corner portion, and controlling the actual temperature at the corner portion so that the temperature matches the optimal temperature.

The wall thickness at the corner portion (in particular, the portion near the boundary between the corner portion and the wall portion) tends to increase in the arc fusing process because fused silica comes from the wall portion by gravity and it comes from the bottom portion by centrifugal force due to the rotation of the mold. Therefore, the wall thickness of the corner portion tends to be larger than the designed value. Therefore, the crucible thickness can be controlled by controlling the temperature at the corner portion so as to match the optimal temperature for the corner portion.

In the present invention, the optimal temperatures are preferred to be determined for plural (2 or more) points in the silica powder layer to control the actual temperatures at those points. As the number of the points increases, the accuracy improves, but the burden and cost increases. Therefore, the number of points is determined in consideration of the balance of the accuracy, burden, and cost.

BRIEF DESCRIPTION OF THE DRAWINGS

FIGS. 4(a) and 4(b) are graphs showing the variation of temperature measured at temperature measuring positions in the silica powder layer. FIG. 4(b) is a graph showing the measured temperatures.

DESCRIPTION OF THE PREFERRED EMBODIMENTS

Hereinafter, an embodiment of a method of manufacturing a vitreous silica crucible, according to the present invention, will be explained with reference to drawings.

Figure 1:
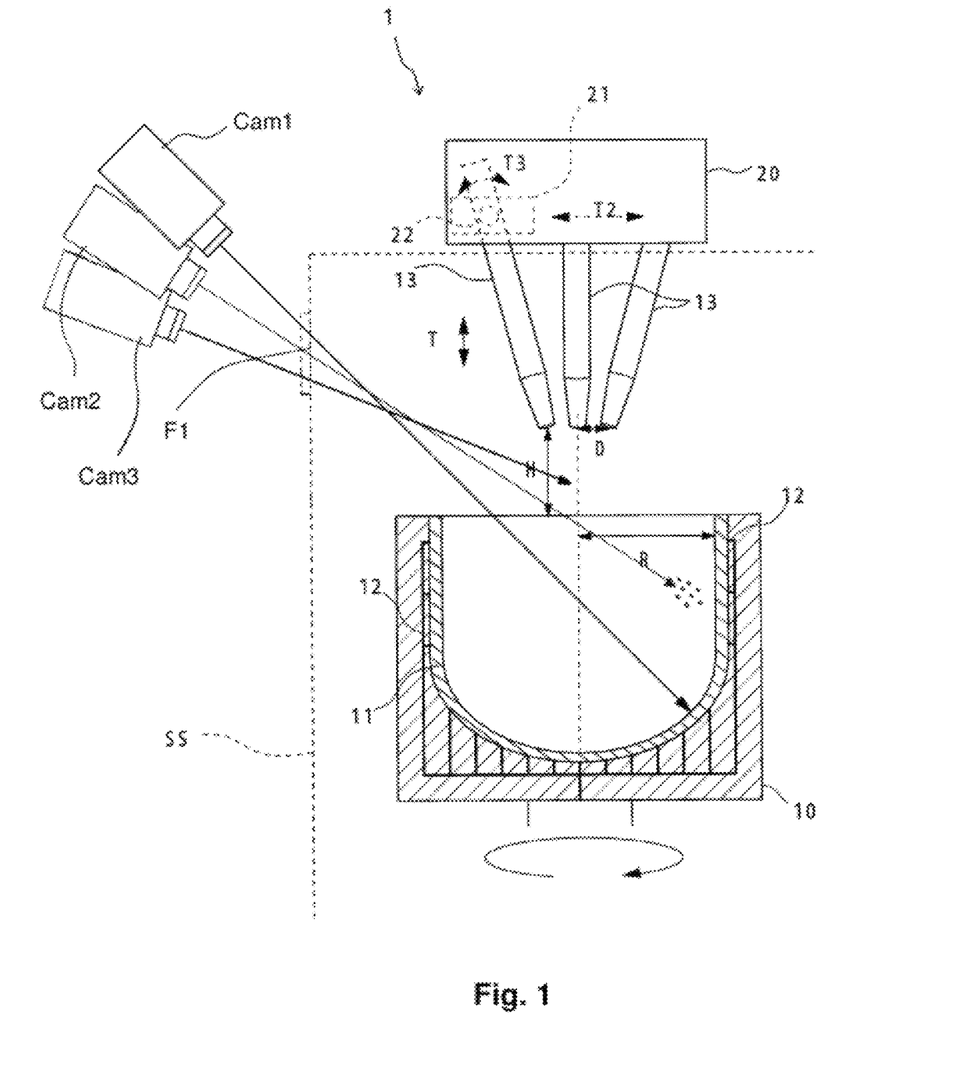
FIG. 1 is a schematic front view showing an embodiment of an apparatus for manufacturing a vitreous silica crucible.

FIG. 1 is a schematic front view showing an embodiment of an apparatus 1 for manufacturing a vitreous silica crucible.

The apparatus 1 is a high-output apparatus which can heat and fuse a nonconductive material (silica powder) by arc discharge between carbon electrodes 13 with an output range of 300 kVA to 12,000 kVA.

The apparatus 1 includes a mold 10 as shown in FIG. 1. The mold 10 is rotatable by a rotation unit (not shown), and defines an outer shape of a vitreous silica crucible. Silica powder is supplied and deposited on the inner surface of the mold 10 to form a silica powder layer 11 with a predetermined thickness.

The mold 10 includes ventilation passages 12 which are open to the inside of the mold 10. The ventilation passages 12 are connected to a pressure-reducing unit (not shown). Carbon electrodes 13 connected to a power-supply unit (not shown) are provided above the mold as an arc discharge unit. Arc flame generated by arc discharge of the carbon electrodes 13 heats and fuses the silica powder layer 11.

Figure 2A:
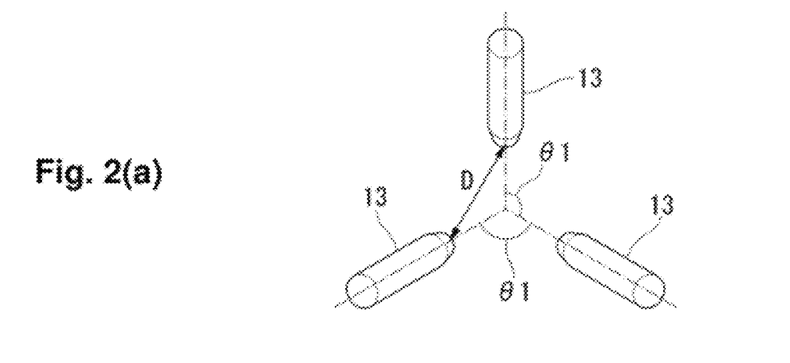
FIGS. 2(a) and 2(b) are a schematic plan view and a schematic side view, respectively, showing the carbon electrodes of FIG. 1.
Figure 2B:
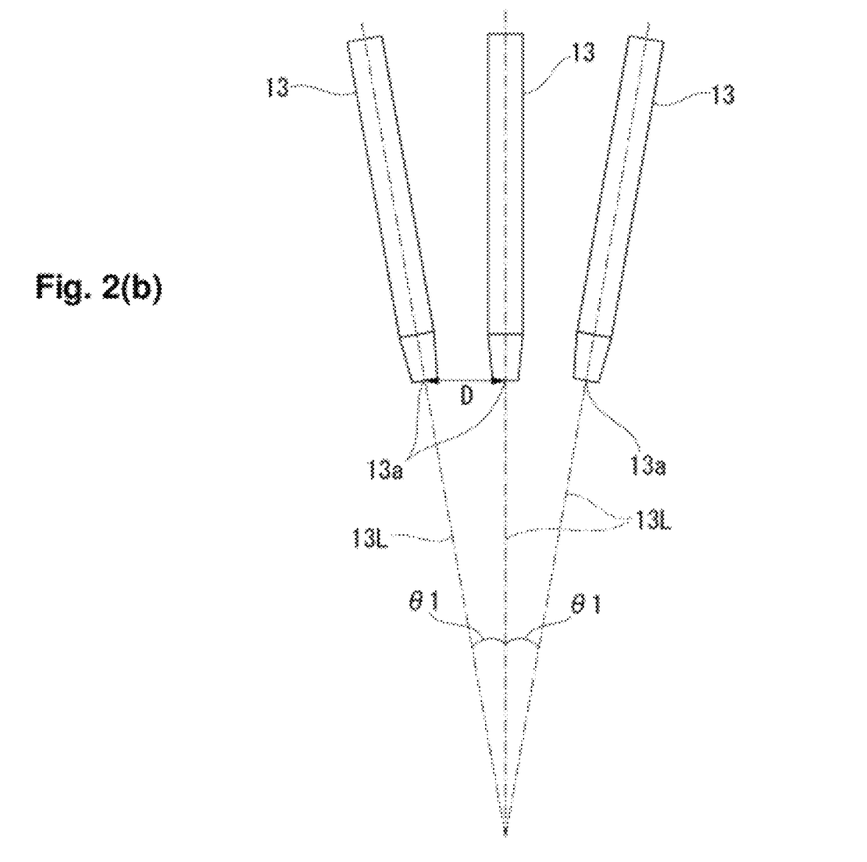

The carbon electrodes 13 are of the same shape so that they are used to generate arc discharge in alternate current three phase (R phase, S phase, T phase). As shown in FIGS. 1 and 2, they are provided to form an inverse three-sided pyramid having a downwardly-directed tip. In addition, they are provided so that angles between axes 13L of the electrodes 13 are 01 (e.g. 120 deg.). The number, a position, and a power supply method are not limited to the above-mentioned configuration, and other configurations may be employed.

The carbon electrodes 13 are vertically movable as shown by the arrow T by an electrode position setting unit 20 so that the height position H of the electrode tips 13a (the height position from the upper end of the silica powder layer 11 or the upper end of the mold opening) is adjustable. Furthermore, the opening angle of the carbon electrodes 13 and the interelectrode distance D shown by the arrow D are adjustable by the electrode position setting unit 20. Furthermore, the other relative position of the carbon electrodes 13 to the mold 10 is also adjustable by the electrode position setting unit 20.

Specifically, as shown in FIG. 1, the electrode position setting unit 20 includes a supporting unit 21, a horizontal movement unit, and a vertical movement unit. The supporting unit 21 supports the carbon electrode 13 so that the interelectrode distance D is adjustable. The horizontal movement unit enables horizontal movement of the supporting unit 21. The vertical movement unit enables vertical movement of the supporting units 21 (i.e. the supporting unit for each carbon electrode) and the horizontal movement units together.

In the supporting unit 21, the carbon electrode 13 is rotatably supported at an angle setting axis 22, and there is provided a rotation unit to control a rotation angle of the angle setting axis 22.

The interelectrode distance D between the carbon electrodes 13 can be adjusted by changing the angle of the carbon electrodes 13 by the rotation unit as shown by the arrow T3 in FIG. 1 and the horizontal position of the supporting unit 21 by the horizontal movement unit as shown by the arrow T2. Furthermore, the height position H can be adjusted by changing the height position of the supporting unit 21 by the vertical movement unit.

In FIG. 1, only the carbon electrode 13 at the left end is supported by the supporting unit 21 and so on. However, other carbon electrodes are also supported by the same structure. A height of each of the carbon electrodes 13 is separately controllable.

The carbon electrodes 13 may be made of highly-pure carbon particles with a particle diameter of 0.3 mm or less, preferably 0.1 mm or less, more preferably 0.05 mm or less. When the density is 1.30 g/cm$^3$ to 1.80 g/cm$^3$, preferably 1.30 g/cm$^3$ to 1.70 g/cm$^3$, the difference in density between the carbon electrodes 13 can be made 0.2 g/cm$^3$ or less, and thus those electrodes are highly uniform.

The apparatus 1 has a temperature measurement unit for measuring the actual temperature of the inner surface of the silica powder layer 11 during heating and fusing in the mold, the actual temperature of SiO fume generated during arc fusing, and the actual temperature of arc flame generated in arc discharge.

In this example, the temperature measurement unit includes three radiation thermometers Cam1 to Cam3. The radiation thermometers Cam1, Cam2, and Cam3 are configured to measure the actual temperatures of the inner surface of the silica powder layer 11, the fume, and the arc flame, respectively.

Furthermore, the apparatus 1 also has a temperature controller for controlling each actual temperature so that each actual temperature measured by the temperature measurement unit becomes each optimal temperature during heating and fusing.

The radiation thermometers Cam1 to Cam3 provided as a temperature measurement unit in the present embodiment measure the temperature by detecting radiation energy from the measuring object. The radiation thermometers Cam1 to Cam3 are provided on the outer side of the partition wall SS, as shown in FIG. 1. The partition wall SS separates, from the outer side, the inner side where the arc discharge is carried out. The radiation thermometers Cam1 to Cam3 each includes an optical system for condensing radiation energy light from the measuring object such as the fused portion through the filter F1 covering a window provided on the partition wall SS, a spectroscopic unit for obtaining a spectrum for the condensed light, and a detection element for detecting light related to the measuring object from the spectrum. The radiation thermometers Cam1 to Cam3 are connected to a controller for receiving necessary signals such as an analog output signal of the detection element or a setting signal from a setting unit to carry out calculation from the signals to measure the temperature.

Each of the radiation thermometers Cam1 to Cam3 condenses the radiation energy light from each of the inner surface of the silica powder layer 11, the fume, and the arc flame via the optical system such as a lens, obtains a spectrum for the condensed light by the spectroscopic unit, and detects light of a predetermined wavelength from the spectrum.

The analog output signal of the detection element is divided by the wavelength by a synchronous detector, amplified by an amplifier. Thereafter, the signal is transmitted to a controller (CPU) via a multichannel, low resolution, and small bit AD converter. The signal is subjected to arithmetic processing in the CPU to produce a desired temperature signal. Thereafter, the temperature signal can be outputted to a display unit such as a LCD display. Furthermore, the temperature signal can be outputted to the temperature controller of the apparatus 1. The temperature controller controls the manufacturing conditions in real time based on the information so that the actual temperature matches the preset optimal temperature.

The temperature controller controls the actual temperatures of the inner surface of the silica powder layer 11, the fume, and the arc flame, and is connected to the electrode position setting unit 20. The temperature controller in this example controls the actual temperatures of the inner surface of the silica powder layer 11, the fume, and the arc flame by changing at least one of the amount of current supplied to the carbon electrodes 13, the position of the carbon electrodes 13, the relative position of the mold 10 and the carbon electrodes 13, and the position of the mold 10.

Here, the position of the carbon electrodes 13 refers to the opening angle of the carbon electrodes 13, and the horizontal or height position of the electrode tips 13a, and the direction to which the arc flame generated by the carbon electrodes 13 is thrown.

Furthermore, the relative position of the mold 10 and the carbon electrodes 13 refers to the relative position of the direction of the mold rotation axis and the direction of the electrode center, and the relative position of the mold 10 and the height position of the electrode tips 13a, and the relative position of the mold 10 and the horizontal position of the electrode tips 13a.

Furthermore, the mold position refers to, for example, the direction of the mold rotation axis.

Hereinafter, a method of manufacturing a vitreous silica crucible by use of the apparatus 1 will be explained.

First, a preparation process is carried out to determine the optimal temperature during heating and fusing the silica powder layer 11 for each of the inner surface of the silica powder layer 11, SiO fume generated during arc fusing, and arc flame generated in arc discharge.

Here, the optimal temperature can be determined empirically, or by a computational method such as simulation. For example, the time-course temperature data for the inner surface of the silica powder layer 11, the fume, and the arc flame during heating and fusing the silica powder layer for manufacturing a crucible is acquired by use of the radiation thermometers Cam1 to Cam3 for many crucibles. Then, by use of each of these crucibles, a silicon single crystal is pulled at 1400 deg. C. or more by the CZ method. Then, from the time-course temperature data for the crucible which has enabled stable manufacturing of a high-quality silicon single crystal by the CZ method, the time-course optimal temperature of the inner surface of the silica powder layer 11, the fume, and the arc flame during heating and fusing the silica powder layer 11 can be determined empirically, or by a computational method.

When the optimal temperature for the inner surface of the silica powder layer 11 is determined beforehand, and the optimal temperature is used to control the inner surface temperature in the below-mentioned temperature controlling process, the crucible inner surface state which largely influences the property of the manufactured silicon single crystal can be suitably controlled.

Furthermore, when the optimal temperature for the silica powder layer 11 is determined at a position corresponding to the corner portion of the vitreous silica crucible, the fused state of the silica powder layer 11 can be controlled more precisely in manufacturing a vitreous silica crucible.

The present inventors have discovered that the temperature variation during heating and fusing the silica powder layer 11 is large at the corner portion which is located between the wall portion and the bottom portion, as explained by use of FIGS. 3 and 4. Therefore, it is possible to more precisely control the state of the crucible inner surface by controlling the temperature at the corner portion so that the temperature at the corner portion matches the optimal temperature determined for the corner portion.

The wall thickness at the corner portion (in particular, the portion near the boundary between the corner portion and the wall portion) tends to increase in the arc fusing process because fused silica comes from the wall portion by gravity and it comes from the bottom portion due to centrifugal force of the mold 10. Therefore, the wall thickness of the corner portion tends to be larger than the designed value. Therefore, the crucible thickness can be controlled by controlling the temperature so as to match the optimal temperature for the corner portion.

The radiation thermometer Cam1 for measuring the temperature of the silica powder layer is preferred to have a range of measuring temperature of 400 to 2800 deg. C., and detect the radiation energy of a wavelength of 4.8 to 5.2 μm to measure the temperature. The measuring temperature of 400 to 2800 deg. C. covers the whole range of temperature during heating and fusing the silica powder layer 11. The temperature lower than 400 deg. C. is not very much related to the crucible property, and thus it is not meaningful to measure such temperature to determine the optimal temperature. The temperature higher than 2800 deg. C. is unpractical.

When the radiation thermometer measures the temperature by detecting the radiation energy of a wavelength of 4.8 to 5.2 μm, the accuracy of the temperature measurement improves.

Figure 5:
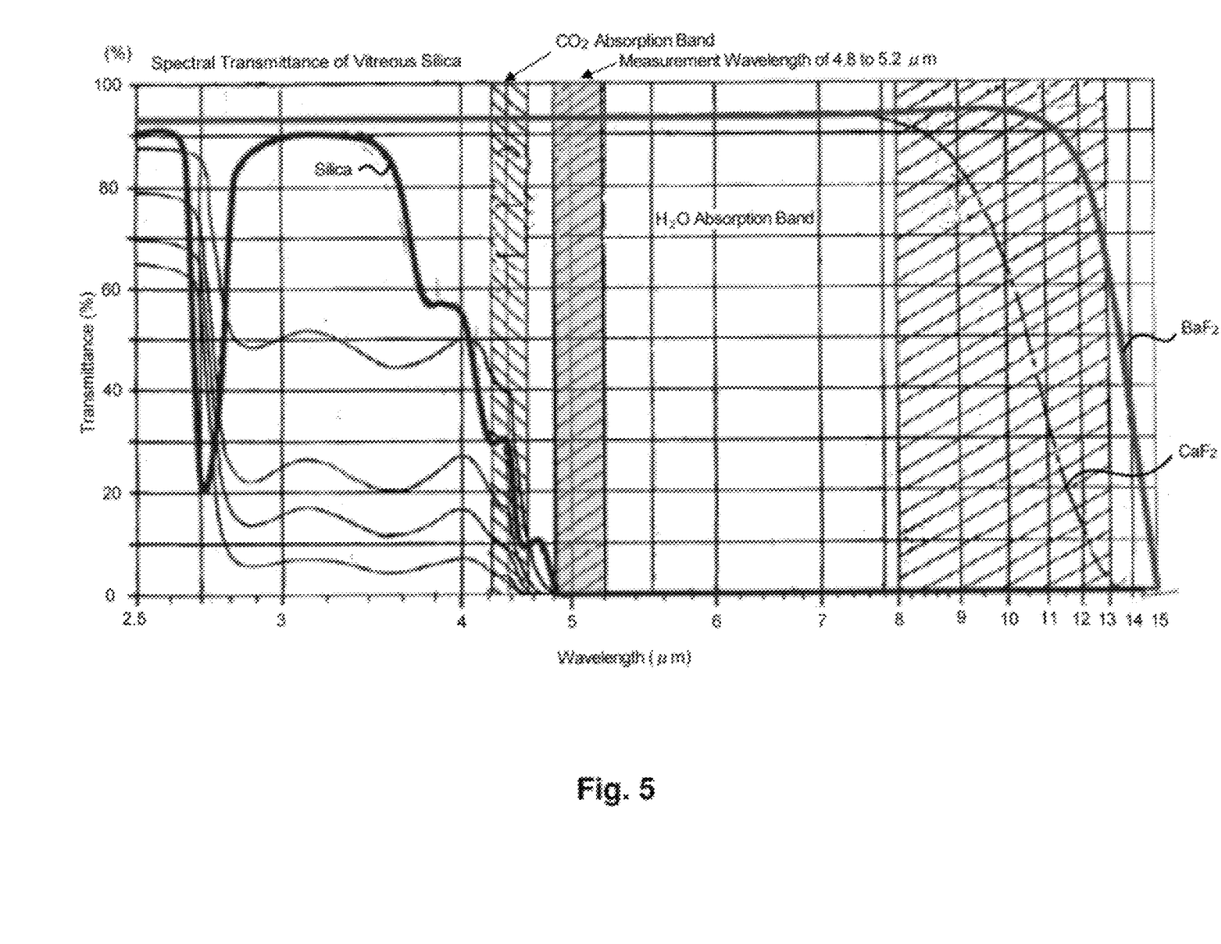
FIG. 5 is a graph showing the relationship between the spectral transmittance of vitreous silica and the wavelength.

FIG. 5 is a graph showing the relationship between the spectral transmittance and the wavelength. As shown in this graph, the absorption band by $CO_2$ which can be generated from the carbon electrodes 13 during the arc discharge is 4.2 to 4.6 μm. Thus, it is necessary to avoid this wavelength range to avoid influence of $CO_2$ absorption on the temperature measurement. Furthermore, in order to measure the surface temperature of the vitreous silica which is a measuring object, the transmittance of the vitreous silica needs to be 0. Therefore, the measurement wavelength needs to 4.8 μm or more. Furthermore, $H_2O$ contained in the air which is an ambient atmosphere during manufacturing a vitreous silica crucible has an absorption band of 5.2 to 7.8 μm. This wavelength range needs to be avoided.

In view of these points, it is preferred to measure the temperature by detecting the radiation energy of a wavelength of 4.8 to 5.2 μm. The wavelength range may be 4.85, 4.90, 4.95, 5.00, 5.05, 5.10, 5.15, and 5.20 μm, or it can be in the range between two values of the values exemplified here.

The radiation thermometer Cam2 for measuring the temperature of the fume is not in particular limited in terms of the range of measuring temperature. It is preferred to be configured to detect the radiation energy of a wavelength of 4.8 to 5.2 μm to measure the temperature. The wavelength range may be 4.85, 4.90, 4.95, 5.00, 5.05, 5.10, 5.15, and 5.20 μm, or it can be in the range between two values of the values exemplified here.

The transmittance of the fume is virtually 0 for such range of wavelength, and the $CO_2$ absorption band and $H_2O$ absorption band can be avoided when such range of wavelength is used. Thus, the temperature of the fume can be measured by detecting the radiation energy of such wavelength.

The radiation thermometer Cam3 for measuring the temperature of the arc flame is not in particular limited in terms of the range of measuring temperature. It is preferred to be configured to detect the radiation energy of a wavelength of 4.8 to 5.2 μm to measure the temperature. The wavelength range may be 4.85, 4.90, 4.95, 5.00, 5.05, 5.10, 5.15, and 5.20 μm, or it can be in the range between two values of the values exemplified here.

The transmittance of the arc flame is virtually 0 for such range of wavelength, and the $CO_2$ absorption band and $H_2O$ absorption band can be avoided when such range of wavelength is used. Thus, the temperature of the arc flame can be measured by detecting the radiation energy of such wavelength.

Figure 6:
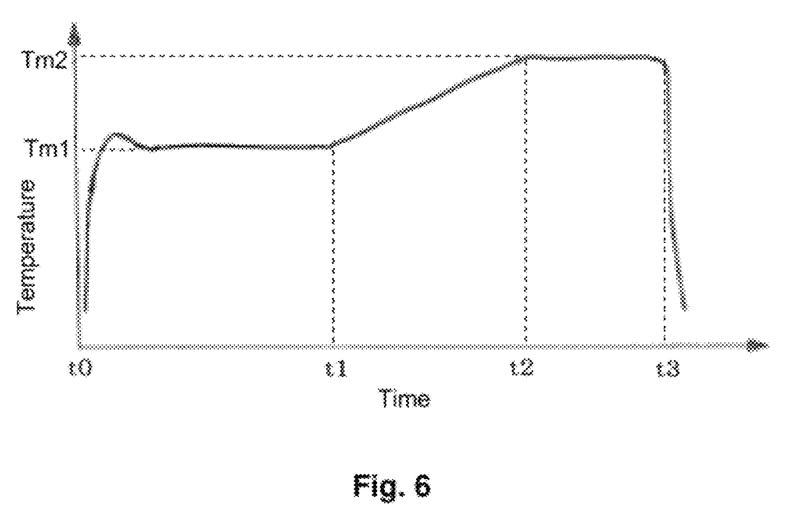
FIG. 6 is a graph showing the time-course change of the optimal temperature at a point corresponding to the corner portion.

FIG. 6 is a graph showing the time-course optimal temperature for the inner surface of the position R-W. In this graph, power supply is started at time t0 (S31 in FIG. 7), and the power supply is terminated at time t3 (S33 in FIG. 7).

This graph is obtained by a computational method based on the relationship among the time-course temperature data obtained at the position R-W in the arc fusing process in manufacturing ten crucibles (opening diameter of 914 mm, 36 inches), the single crystallization yield obtained when silicon single crystals are pulled by the CZ method by use of the manufactured crucibles, and the final yield of silicon wafers.

Figure 7:
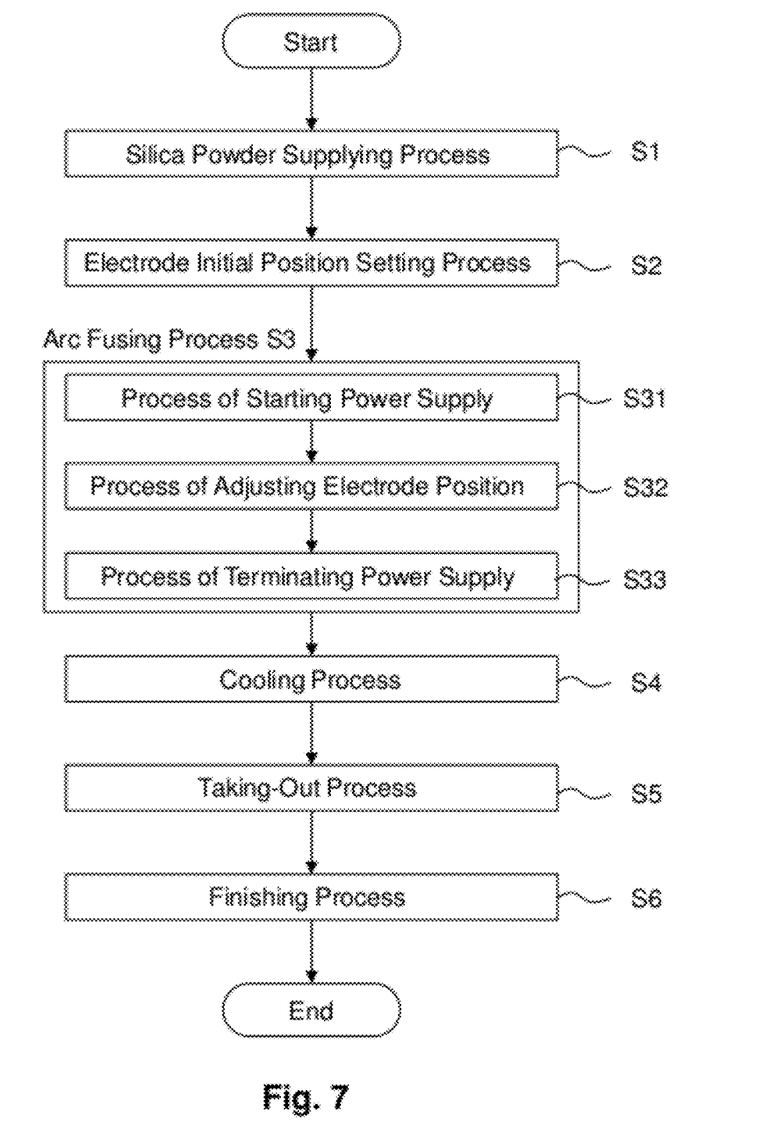
FIG. 7 is a flowchart showing an embodiment of the method of manufacturing a vitreous silica crucible.

Furthermore, in the present embodiment, a graph showing the time-course optimal temperature for the fume is formed under the conditions that power supply is started at time t0 (S31 in FIG. 7), and the power supply is terminated at time t3 (S33 in FIG. 7).

This graph is obtained by a computational method based on the relationship among the time-course temperature data of the fume during heating and fusing the silica powder layer in manufacturing ten crucibles (opening diameter of 914 mm, 36 inches), the single crystallization yield obtained when silicon single crystals are pulled by the CZ method by use of the manufactured crucibles, and the final yield of silicon wafers.

Furthermore, in the present embodiment, a graph showing the time-course optimal temperature for the arc flame is formed under the conditions that power supply is started at time t0 (S31 in FIG. 7), and the power supply is terminated at time t3 (S33 in FIG. 7).

This graph is obtained by a computational method based on the relationship among the time-course temperature data of the arc flame during heating and fusing the silica powder layer in manufacturing ten crucibles (opening diameter of 914 mm, 36 inches), the single crystallization yield obtained when silicon single crystals are pulled by the CZ method by use of the manufactured crucibles, and the final yield of silicon wafers.

Furthermore, the filter F1 is preferred to be made of $BaF_2$ or $CaF_2$. The transmittance of such filter F is high for light having a specific range of wavelength which is radiated from the crucible inner surface, which is a measuring object. Therefore, by use of the filter F, the intensity of the light used for the temperature measurement is not weakened.

When the filter F made of $BaF_2$ or $CaF_2$ is used, it is preferred not to use a wavelength of 8 to 14 μm for measurement because the transmittance of $BaF_2$ or $CaF_2$ is low for such wavelength. Therefore, it is possible to prevent the drop of the transmittance and enhance the accuracy of temperature measurement by not using such wavelength.

In the temperature measurement of the silica powder layer 11 and the fume, the observation line connecting the radiation thermometer and the measuring point can be separated by 100 mm or more from the carbon electrodes. In this case, the arc flame and electrode radiation generated near the carbon electrodes do not seriously disturb the accuracy of the temperature measurement.

When the distance from the observation line to the carbon electrodes 13 is smaller than 100 mm, the accuracy of the temperature measurement lowers. When the distance is larger than the crucible radium, the distance is too large for accurate temperature measurement of a specific measuring point M. In addition, the amount of radiation from the measuring point to the radiation thermometer becomes insufficient, and thus the temperature measurement becomes inaccurate.

After the aforementioned preparation process is carried out, a vitreous silica crucible is manufactured by the rotating mold method. FIG. 7 shows a flowchart of the manufacturing process.

Specifically, in a silica powder supplying process 51, silica powder is deposited on the inner surface of the mold 10 to form a silica powder layer 11. The silica powder layer 11 is retained on the inner surface of the mold by the centrifugal force generated by the rotation of the mold 10.

In the electrode initial position setting process S2 shown in FIGS. 1 and 2, the initial position of the carbon electrodes 13 are set by the electrode position setting unit 20 so that the carbon electrodes 13 form an inverse three-sided pyramid, each axis line 13L is directed to a direction so as to maintain an angle θ1, and the tips 13a of the carbon electrodes 13 contact one another. In addition, an initial state of a mold-electrode relative position comprised of an electrode height position H which is a height dimension from the edge of the mold 10 to the electrode tips, or a position and an angle of an electrode position central axis (which is a central axis of an inverse three-sided pyramid formed by the carbon electrodes 13) and a rotation axis line of the mold 10 is also set.

In the arc fusing process S3, the retained silica powder layer 11 is heated and fused by an arc discharge unit by adjusting positions of the electrodes 13 while depressurizing the silica powder layer 11 through ventilation passages 12, to form a vitreous silica layer.

The arc fusing process S3 includes a process of starting the power supply S31, a process of adjusting the electrode position S32, and a process of terminating the power supply S33.

In the process of starting the power supply S31, powder is supplied to the carbon electrodes 13 in a predetermined amount from the power-supply unit (not shown). Arc discharge is not yet generated at this stage.

In the process of adjusting the electrode position S32, the interelectrode distances D are enlarged by changing the angles of the carbon electrodes 13 while maintaining the inverse three-sided pyramid with a downward tip by the electrode position setting unit 20. Then, arc discharge starts to be generated between the carbon electrodes 13. Supplied power to each of the carbon electrodes 13 is controlled to be a power density of, for example, 40 kVA/cm² to 1700 kVA/cm² by the power-supply unit. Furthermore, the mold-electrode relative position, such as the electrode height position H, is set to satisfy conditions to be a heat source necessary for fusing the silica powder layer 11 while maintaining the angles of θ1 by the electrode position setting unit 20. Thus, the silica powder layer 11 is heated and fused.

In the process of terminating the power supply S33, the power supply by the power-supply unit is terminated when the silica powder layer 11 is fused to be a predetermined state.

By this arc fusing, the silica powder layer is fused to manufacture a vitreous silica crucible. In the arc fusing process S3, the rotation of the mold 10 is controlled by a controller (not shown).

In the present embodiment, the arc fusing process S3 includes processes of carrying out time-course measurement of the actual temperatures of the inner surface (the portion corresponding to the corner portion) of the silica powder layer 11, the fume, and the arc flame by the radiation thermometers Cam1 to Cam3, and carrying out time-course control of their actual temperatures so that each of the temperatures becomes the optimal temperature determined for each of them in the preparation process.

Specifically, in heating and fusing the silica powder layer 11, the temperature controller changes at least one of the amount of current supplied to the carbon electrodes 13, the position of the carbon electrodes 13, the relative position of the mold 10 and the carbon electrodes 13, and the position of the mold 10, so as to adjust each of the actual temperatures so that the temperature becomes the optimal temperature.

By this method, the temperatures of the inner surface of the silica powder layer 11, the fume, and the arc flame can be controlled to be the optimal temperatures, and thus the silica powder layer 11 can be heated and fused while the fused state is appropriately controlled. As a result, a vitreous silica crucible having an appropriately controlled crucible property can be manufactured.

In the cooling process S4, after the power supply is terminated, the vitreous silica layer is cooled. In the taking-out process S5, the cooled vitreous silica crucible is taken out of the mold 10. In the finishing process S6, a honing process of spraying high-pressure water onto the outer surface of the crucible, a rim-cutting process of adjusting the crucible height to a predetermined dimension, and a washing process of washing the inner surface of the crucible with hydrofluoric acid are carried out. A vitreous silica crucible can be obtained by the processes above.

Figure 8:
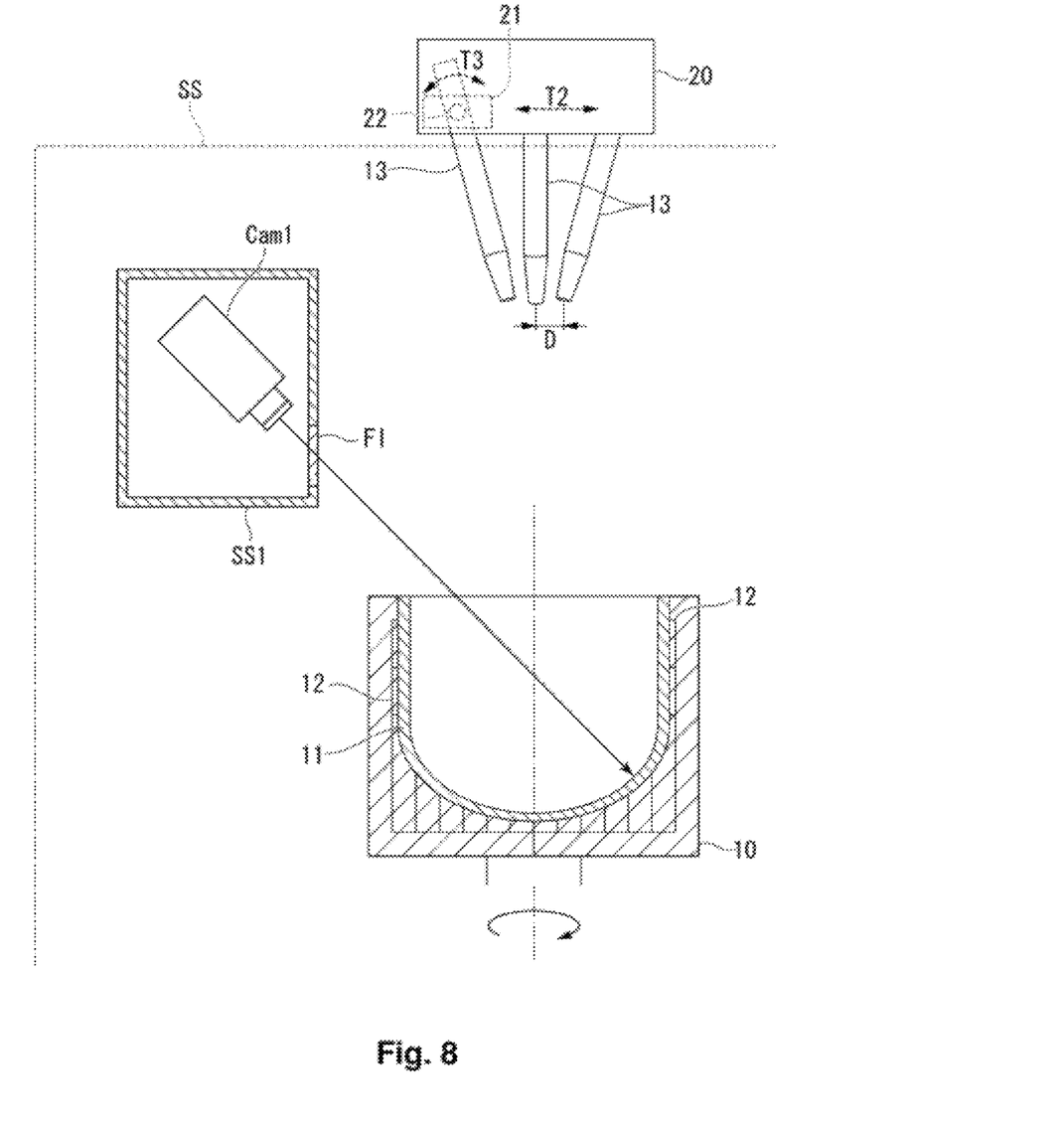
FIG. 8 is a schematic front view showing another embodiment of an apparatus for manufacturing a vitreous silica crucible.

In the present embodiment, the radiation thermometers are provided on the outer side of the partition wall SS of the arc furnace. However, they may be provided inside a shield SS1 provided on the inner side of the partition wall SS as shown in FIG. 8. In FIG. 8, the radiation thermometers Cam2, Cam3 are not shown. In this case, the shield SS1 is provided with a filter F1.

As explained above, according to such method of manufacturing a vitreous silica crucible, the temperatures of the inner surface of the silica powder layer 11, the fume, and the arc flame can be controlled to be the optimal temperatures, and thus the silica powder layer 11 can be heated and fused while the fused state is appropriately controlled. As a result, a vitreous silica crucible having an appropriately controlled crucible property can be manufactured. It should be noted that even when one or two of the actual temperatures of the silica powder layer 11, the fume, and the arc flame is controlled, the effect of the invention can be exhibited.

When the optimal temperatures and actual temperatures of the silica powder layer 11, the fume, and the arc flame are measured by detecting the radiation energy of a wavelength of 4.8 to 5.2 μm, those temperatures can be accurately measured.

Furthermore, when the optimal temperature and the actual temperature of the silica powder layer 11 are temperatures of the inner surface of the silica powder layer 11, the crucible inner surface state which largely influences the property of the manufactured silicon single crystal can be particularly suitably controlled.

Furthermore, in the preparation process, when the optimal temperatures are determined with time, and the actual temperatures are controlled with time, the inner surface property of the manufactured vitreous silica crucible can be more suitably controlled.

Furthermore, when the optimal temperature and the actual temperature of the silica powder layer 11 are temperatures at a portion corresponding to the corner portion of the vitreous silica crucible, the fused state of the silica powder layer can be more precisely controlled.

As silica powder, synthetic silica powder is primarily used for the inner face layer and natural silica powder is primarily used for the outer layer.

Here, synthetic silica powder means powder made of synthetic silica, and is a chemically synthesized and manufactured material. Synthetic silica powder is amorphous. Because raw material of synthetic silica is gas or liquid, it can be easily purified, and thus synthetic silica powder can be more highly-pure than natural silica powder. Raw material of synthetic silica may be gaseous raw material such as silicon tetrachloride, or may be liquid raw material such as silicon alkoxide. In synthetic silica powder, the amount of any metal impurity can be made 0.1 ppm or less.

Synthetic silica powder made by the sol-gel method usually includes 50 to 100 ppm of residual silanol. The amount of silanol of synthetic silica powder made by silicon tetrachloride as raw material can be controlled in a broad range of 0 to 1000 ppm, and usually includes chlorine in a concentration of approx. 100 ppm or more. When alkoxide is used as raw material, synthetic vitreous silica not including chlorine can be easily obtained.

Synthetic silica powder made by the sol-gel method includes silanol in a concentration of 50 to 100 ppm before fusing as mentioned above. When the powder is vacuum-fused, silanol is removed and the amount of silanol in the obtained vitreous silica is reduced to approx. 5 to 30 ppm. It should be noted that the amount of silanol changes depending on fusing conditions such as fusing temperature, elevated temperature etc. Natural vitreous silica obtained by fusing natural silica powder in the same conditions includes silanol in a concentration of less than 5 ppm.

In general, synthetic vitreous silica (vitreous silica obtained by fusing synthetic silica powder) is said to have lower high-temperature viscosity than natural vitreous silica (vitreous silica obtained by fusing natural silica powder). One of the reasons for the lower high-temperature viscosity is that silanol or halogen destroys a mesh structure of $SiO_4$ tetrahedron.

Synthetic vitreous silica has high light transmissibility for ultraviolet with a wavelength of approx. 200 nm or less. This synthetic vitreous silica has similar property to synthetic vitreous silica made of silicon tetrachloride as raw material and for ultraviolet optics.

Unlike natural vitreous silica, when synthetic vitreous silica is excited by ultraviolet light with a wavelength of 245 nm, fluorescence peaks are not observed in the obtained fluorescence spectrum.

Furthermore, natural silica powder means powder made of natural silica. Natural silica means a material obtained by the processes of digging out naturally-existing quartz raw stones followed by crushing and purification etc. Natural silica powder is made of α-quartz crystal. Natural silica powder contains Al and Ti in a concentration of 1 ppm or more. Natural silica powder contains other metal impurities in a higher concentration than synthetic silica powder. Natural silica powder barely contains silanol. Natural vitreous silica includes silanol in a concentration of less than 50 ppm.

When light transmissibility of natural vitreous silica is measured, light transmissibility rapidly decrease as the wavelength becomes shorter than 250 nm and light transmissibility is very small for light with a wavelength of 200 nm. This is mainly because of Ti contained in a concentration of about 1 ppm as impurities. An absorption peak is observed at around 245 nm. This peak is assigned to oxygen deficiency defects.

When natural vitreous silica is excited by ultraviolet light with a wavelength of 245 nm, fluorescence peaks at wavelengths of 280 nm and 390 nm are observed. These peaks are assigned to oxygen deficiency defects in the vitreous silica.

Whether vitreous silica is natural or synthetic may be determined by measuring either impurities concentrations, the amount of silanol, light transmissibility, or a fluorescence spectrum obtained by exciting the vitreous silica with ultraviolet light with a wavelength of 245 nm.

In the present invention, silica powder is used as raw material. Silica powder may be either synthetic silica powder or natural silica powder. Natural silica powder may be quartz powder, or powder of a well-known raw material for a vitreous silica crucible such as quartz crystal, quartz sand etc. Furthermore, silica powder may be crystalline, amorphous, or vitreous.

Up to here, the embodiments of the present invention have been described, but these embodiments are just examples of the present invention, and various modifications are possible. Configurations described in the aforementioned embodiments can be employed in combination.

EXAMPLE

Hereinafter, the present invention will be explained in more detail with reference to the examples. The present invention is not limited by these examples.

Figure 9:
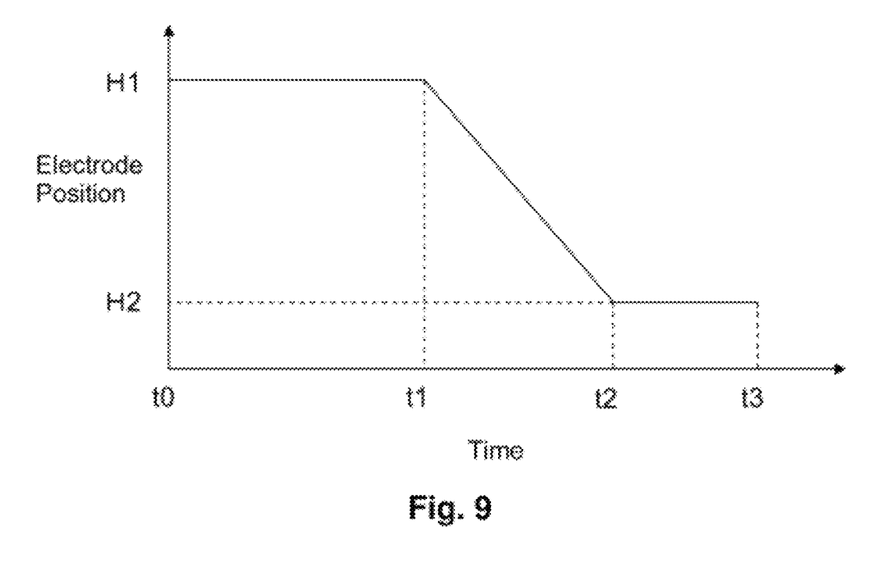
FIG. 9 is a graph showing the height position change of the carbon electrodes in an embodiment of the method of manufacturing a vitreous silica crucible, according to the present invention.

A vitreous silica crucible having a diameter of 610 mm (24 inches) was manufactured. In the manufacturing, the height position H of the electrode tips 13a was subjected to time-course change as shown in FIG. 9 by the electrode position setting unit 20 shown in FIG. 1. The height position was H1 from time t0 to t1, and the height position was H2 from time t2 to t3 (H1>H2).

Example 1

While manufacturing, the temperature at the position R-W shown in FIG. 3 was measured during arc fusing by use of a radiation thermometer. During the arc fusing, fine adjustment of the height position H and the supplied power were carried out so that the measured temperature was within +/−15 deg. C. from the optimal temperature preset as shown in FIG. 6.

Example 2

Example 2 was carried out in the same way as Example 1 except that the temperature measuring point of Example 1 was changed into the fume, and fine adjustment of the height position H and the supplied power were carried out so that the measured temperature was within +/−15 deg. C. from the preset time-course optimal temperature for the fume.

Example 3

Example 3 was carried out in the same way as Example 1 except that the temperature measuring point of Example 1 was changed into the arc flame, and fine adjustment of the height position H and the supplied power were carried out so that the measured temperature was within +/−15 deg. C. from the preset time-course optimal temperature for the arc flame.

Example 4

Example 4 was carried out in the same way as Example 1 except that the temperature of the fume during arc fusing was also measured, and fine adjustment of the height position H and the supplied power were carried out so that the measured temperature was within +/−15 deg. C. from the preset time-course optimal temperature for the fume.

Example 5

Example 5 was carried out in the same way as Example 1 except that the temperature of the arc flame was also measured, and fine adjustment of the height position H and the supplied power were carried out so that the measured temperature was within +/−15 deg. C. from the preset time-course optimal temperature for the arc flame.

Example 6

Example 6 was carried out in the same way as Example 4 except that the temperature of the arc flame was also measured, and fine adjustment of the height position H and the supplied power were carried out so that the measured temperature was within +/−15 deg. C. from the preset time-course optimal temperature for the arc flame.

In Examples 1 to 6, in the arc fusing process, the arc fusing portion and the measuring point were matched by controlling the electrode position or the mold height position. The temperatures were measured by detecting the radiation energy of a wavelength of 4.8 to 5.2 μm by use of a radiation thermometer.

Comparative Example 1

Comparative Example 1 was carried out in the same way as Example 1 except that temperature measurement, fine adjustment of the height position H and the supplied power were not carried.

A silicon single crystal was pulled by use of the thus-manufactured vitreous silica crucible, and the single crystallization yield of the pulled ingot was measured, and the evaluation was carried out according to the following criteria. The result is shown in Table 1. The single crystallization yield was evaluated by visual inspection of crystal dislocation which can be seen from the shift of a crystal habit on the surface of a silicon single crystal ingot.

A (Excellent) Single crystallization yield was over 80%, and thus the crystal property was excellent.

B (Good) Single crystallization yield was 70 to 80%, and thus the crystal property was good.

C (Acceptable) Single crystallization yield was 50 to 70%, and thus crystal property was acceptable.

D (Poor) Single crystallization yield was less than 50%, and thus there were many crystal defects.

TABLE 1

| | Evaluation Result |
|---|---|
| Ex. 1 | C |
| Ex. 2 | C |
| Ex. 3 | C |
| Ex. 4 | B |
| Ex. 5 | B |
| Ex. 6 | A |
| Comp. Ex. 1 | D |

This result shows that it is possible to remarkably improve the efficiency of pulling a silicon single crystal by carrying out feed back control based on the temperature measurement of the inner surface of the position R-W, the fume, and the arc flame. Furthermore, the present examples succeeded in accurately measuring the temperature even in ultra-high temperature during the arc fusing by detecting the radiation energy of a wavelength of 4.8 to 5.2 μm by use of a radiation thermometer.

This indicates that it has become possible to manufacture a vitreous silica crucible having a desired property by carrying out feedback control of the temperature in the arc fusing process. In contrast, in the conventional manufacturing method, it was not possible to accurately measure the temperature, and the arc fusing process was carried out according to a programmed current density, and thus it was not easy to manufacture a vitreous silica crucible having a desired property.

Furthermore, the temperature was measured while the mold was rotating. Therefore, the temperature measurement on one point was the temperature measurement on the circumference including the one point. Furthermore, in the present Example, the arc fusing portion and the measuring point were matched, and thus it was possible to precisely detect the temperature change which happened when the arc fusing conditions were adjusted.

In sum, the present invention has been explained with reference to Examples. It should be understood to those skilled in the art that the Examples are just examples, and various modifications are possible, and those modifications are within the scope of the present invention.

EXPLANATION OF REFERENCE SYMBOL

1 Vitreous Silica Crucible Manufacturing Apparatus
10 Mold
11 Silica Powder Layer
12 Ventilation Passage
13 Carbon Electrode
13a Electrode Tip
13L Axis Line
20 Electrode Position Setting Unit
21 Supporting Unit
22 Angle Set Axis
Cam1, Cam2, Cam3 Radiation Thermometer
SS Partition Wall
F1 Filter
SS1 Shield

What is claimed is:

1. A method of manufacturing a vitreous silica crucible by heating and fusing a silica powder layer in a rotating mold by arc discharge generated by carbon electrodes comprising:
    a preparation process for determining optimal temperatures of the silica powder layer, fume generated during arc fusing, and arc flame generated in the arc discharge during a period of heating and fusing the silica powder layer;
    a temperature measuring process for measuring actual temperatures of the silica powder layer, fume generated during arc fusing, and arc flame generated in the arc discharge during a period of heating and fusing the silica powder layer where the optimal temperatures are determined; and
    a temperature controlling process for controlling the actual temperatures of the silica powder layer, fume generated during arc fusing, and arc flame generated in the arc discharge where the actual temperatures are measured so that the actual temperatures match the optimal temperatures.

2. The method of claim 1, wherein the optimal temperatures and the actual temperatures of the silica powder layer are measured by detecting radiation energy of a wavelength of 4.8 to 5.2 μm.

3. The method of claim 1, wherein the optimal temperature and the actual temperature of the silica powder layer are temperatures of an inner surface of the silica powder layer.

4. The method of claim 1, wherein the optimal temperatures are determined with time, and the actual temperatures are controlled with time.

5. The method of claim 1, wherein the fusing temperature and the actual temperature of the silica powder layer are temperatures at a portion corresponding to a corner portion of the vitreous silica crucible.

* * * * *